(12) United States Patent
Ugur et al.

(10) Patent No.: US 9,373,187 B2
(45) Date of Patent: Jun. 21, 2016

(54) METHOD AND APPARATUS FOR PRODUCING A CINEMAGRAPH

(75) Inventors: Kemal Ugur, Tampere (FI); Ali Karaoglu, Tampere (FI); Miska Hannuksela, Ruutana (FI); Jani Lainema, Tampere (FI)

(73) Assignee: Nokia Corporation, Espoo (FI)

( * ) Notice: Subject to any disclaimer, the term of this patent is extended or adjusted under 35 U.S.C. 154(b) by 19 days.

(21) Appl. No.: 14/403,212

(22) PCT Filed: May 25, 2012

(86) PCT No.: PCT/FI2012/050508
§ 371 (c)(1),
(2), (4) Date: Nov. 24, 2014

(87) PCT Pub. No.: WO2013/175051
PCT Pub. Date: Nov. 28, 2013

(65) Prior Publication Data
US 2015/0104113 A1    Apr. 16, 2015

(51) Int. Cl.
*G06K 9/20* (2006.01)
*G06T 13/80* (2011.01)
*G06T 7/00* (2006.01)
*H04N 5/232* (2006.01)
*H04N 5/262* (2006.01)
*G06K 9/34* (2006.01)

(52) U.S. Cl.
CPC . *G06T 13/80* (2013.01); *G06K 9/34* (2013.01); *G06T 7/0081* (2013.01); *H04N 5/23216* (2013.01); *H04N 5/2621* (2013.01); *G06T 2207/20104* (2013.01); *G06T 2207/20141* (2013.01); *G06T 2207/20221* (2013.01)

(58) Field of Classification Search
CPC ..... G06T 13/80; G06T 7/0081; G06T 7/0083; G06T 7/0089; G06T 2207/204; G06T 2207/2006; G06T 2207/20104; G06T 2207/20221; G06T 2207/10016; G06T 2207/20116; G06K 9/34
USPC .......................................................... 382/283
See application file for complete search history.

(56) References Cited

U.S. PATENT DOCUMENTS

| 6,636,220 B1 | 10/2003 | Szeliski et al. ................. 345/475 |
| 2007/0086675 A1 | 4/2007 | Chinen et al. .................. 382/284 |
| 2013/0229581 A1* | 9/2013 | Joshi .................... G11B 27/031 348/584 |
| 2014/0327680 A1* | 11/2014 | Hoppe .................... G06T 13/80 345/473 |
| 2015/0324096 A1* | 11/2015 | Leblanc ............... G11B 27/034 715/720 |

OTHER PUBLICATIONS

Tomkin, James, et al., "Towards Moment Imagery: Automatic Cinemagraphs", Proceedings of the 2011 Conference for Visual Media Production, Nov. 2011, IEEE Computer Society Washington, DC, 7 pgs.

(Continued)

*Primary Examiner* — Ali Bayat
(74) *Attorney, Agent, or Firm* — Harrington & Smith

(57) ABSTRACT

Method and apparatus for producing a cinemagraph, wherein based on received user input an image from a sequence of images is selected as a baseframe image. The baseframe image is segmented and at least one segment is selected based on user input. A mask is created based on the selected segments and at least one image most similar to the baseframe is selected from the sequence of images using the mask. The selected images are aligned the baseframe image a first cinemagraph is created from the selected images and the baseframe image using the mask.

43 Claims, 4 Drawing Sheets

(56) References Cited

OTHER PUBLICATIONS

Joshi, Neel, et al., "Cliplets: Juxtaposing Still and Dynamic Imagery", Microsoft Research Technical Report, May 15, 2012, 12 pgs.

"Cinemagraph/Subtle GIF Tutorial", online tutorial, Jun. 16, 2011, http://content.photojojo.com/tutorials/how-to-make-cinemagraphs-photos-that-move, 8 pgs.

"How to Make Cinemagraphs—Still Photos that Move like Movies!", online tutorial, May 4, 2011, <URL: blog.anthony-scavarelli.com, 8 pgs.

* cited by examiner

510

610

710

810c   810d

METHOD AND APPARATUS FOR PRODUCING A CINEMAGRAPH

TECHNICAL FIELD

The present application generally relates to producing a cinemagraph.

BACKGROUND

In digital imaging, videos and images are formed with very different objectives, e.g. for artistic effect, for later review of memorable moments or to be published for example in digital or social media. Sometimes, a still image does not capture the moment or relay the desired or artistic effect for later viewing. It may be that a still image is not enough to reflect the action of a moment. Moving pictures or video footage is indeed often a more lively way to capture memories. There are also other ways to convey particular feeling with taken images or videos, e.g. by changing the colors used to black and white or sepia set, for instance.

SUMMARY

Various aspects of examples of the invention are set out in the claims.

According to a first example aspect of the present invention, there is provided an apparatus comprising:
a user interface;
a memory configured to store a sequence of images; and
a processor configured to cause:
receiving user input from a user through the user interface;
selecting based on the user input from the sequence of images an image as a baseframe image;
segmenting the baseframe image;
selecting based on the user input at least one segment of the baseframe image;
creating a mask based on the at least one selected segment;
selecting from the sequence of images at least one image most similar to the baseframe image using the mask;
aligning the selected images with the baseframe image; and
creating a first cinemagraph from the selected images and the baseframe image using the mask.

The apparatus may further comprise a camera unit and the processor may further be configured to cause capturing the sequence of images with the camera unit.

The processor may further be configured to cause creating at least one second cinemagraph by changing the order of the images and the baseframe image in the first cinemagraph.

The processor may further be configured to cause creating at least one second cinemagraph by adding duplicate images to the first cinemagraph.

The processor may further be configured to cause creating at least one second cinemagraph by adding images interpolated from the existing images and the baseframe image of the first cinemagraph to the first cinemagraph.

The apparatus may further comprise a display; and the processor may further be configured to cause presenting the first and the at least one second cinemagraph to the user on the display; and to cause selecting a cinemagraph from the first and at least one second cinemagraph based on the user input.

The baseframe image may be segmented into super-pixels.

The super-pixels may be formed based on image characteristics.

The at least two masks may be created based on the user input.

At least one of the masks may be created using a mask enlargement algorithm to enlarge the mask by further selecting one or more adjacent super-pixels in addition to the selected super-pixels.

At least one of the masks is created using a gap filling algorithm to enlarge the mask by further selecting one or more super-pixels in-between the selected super-pixels in addition to the selected super-pixels.

The processor may further be configured to cause repeating the selecting from the sequence of images at least one image most similar to the baseframe image so that for each mask at least the one image is selected.

The processor may further be configured to cause repeating the aligning the selected images with the baseframe image so that the images selected using each mask are aligned.

The processor may further be configured to cause aligning of the images using an alignment algorithm.

The processor may further be configured to cause repeating the forming a first cinemagraph from the selected images and the baseframe image so that for each mask a first cinemagraph is created.

The processor may further be configured to cause presenting the at least two first cinemagraphs to the user on the display; and to cause selecting a single first cinemagraph from the at least two first cinemagraphs based on the user input.

The mask may comprise a masked area; and the processor may further be configured to cause the selecting from the sequence group of images at least one image most similar to the baseframe image using a mask by determining the smallest rectangle in which the masked area fits and comparing the area of said rectangle in at least some of the images of the sequence of images.

The processor may further be configured to cause comparing the area of said rectangle in at least some of the images of the sequence of images using an algorithm.

The display may be a touch sensitive display; and the processor may be further configured to receive the user input from the touch sensitive display.

The user interface may be configured to receive the user input in at least two different entries from the user The processor may further be configured to cause storing the cinemagraph into a file.

According to a second example aspect of the present invention, there is provided a method comprising:
receiving user input from a user through a user interface;
selecting based on user input an image from a sequence of images as a baseframe image;
segmenting the baseframe image;
selecting based on the user input at least one segment of the baseframe image;
creating a mask based on the at least one selected segment;
selecting from the sequence of images at least one image most similar to the baseframe image using the mask;
aligning the selected images with the baseframe image; and
creating a first cinemagraph from the selected images and the baseframe image using the mask.

The method may further comprise capturing the sequence of images with a camera unit.

The method may further comprise storing a sequence of images into a memory.

The method may further comprise creating at least one second cinemagraph by changing the order of the images and the baseframe image in the first cinemagraph.

The method may further comprise creating at least one second cinemagraph by adding duplicate images to the first cinemagraph.

The method may further comprise creating at least one second cinemagraph by adding images interpolated from the existing images and the baseframe image of the first cinemagraph to the first cinemagraph.

The method may further comprise presenting the first and at least one second cinemagraph to the user; and selecting a cinemagraph from the first and at least one second cinemagraph based on the user input.

The baseframe image may be segmented into super-pixels.

The super-pixels may be formed based on image characteristics.

The at least two masks may be created based on the user input.

At least one of the masks may be created using a mask enlargement algorithm to enlarge the mask by further selecting one or more adjacent super-pixels in addition to the selected super-pixels.

At least one of the masks may be created using a gap filling algorithm to enlarge the mask by further selecting one or more super-pixels in-between the selected super-pixels in addition to the selected super-pixels.

The method may further comprise repeating the selecting from the sequence of images at least one image most similar to the baseframe image so that for each mask at least the one image is selected.

The method may further comprise repeating the aligning the selected images with the baseframe image so that the images selected using each mask are aligned.

The aligning of the images may comprise using an aligning algorithm.

The method may further comprise repeating the forming a first cinemagraph from the selected images and the baseframe image so that for each mask a first cinemagraph is created.

The method may further comprise presenting the at least two first cinemagraphs to the user; and selecting a single first cinemagraph from the at least two first cinemagraphs based on the user input.

The mask may comprise a masked area; and the selecting from the sequence of images at least one image most similar to the baseframe image using a mask may comprise determining the smallest rectangle in which the masked area fits and comparing the area of said rectangle in at least some of the images of the sequence of images.

The comparing the area of said rectangle in at least some of the images of the sequence of images may comprise using an algorithm.

The user input may be received through a touch sensitive display.

The method may further comprise storing the cinemagraph into a file.

According to a third example aspect of the present invention, there is provided a computer program comprising computer code for causing performing the method of the second example aspect when executed by an apparatus.

According to a fourth example aspect of the present invention, there is provided a memory medium comprising the computer program of the third example aspect.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The foregoing embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Some example embodiments of the present invention and potential advantages are understood by referring to FIGS. 1 through 8 of the drawings.

Figure 1:
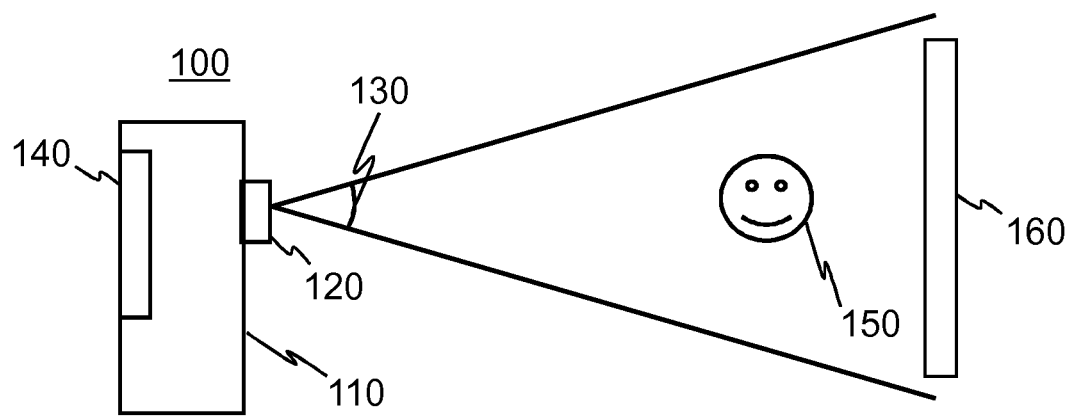
FIG. 1 shows a schematic system for use as a reference with which some example embodiments of the invention can be explained.

FIG. 1 shows a schematic system 100 for use as a reference with which some example embodiments of the invention can be explained. The system 100 comprises a device 110 such as a camera phone, a digital camera or a camcorder having a camera unit 120 with a field of view 130. The system 100 further comprises a display 140. In an example embodiment the display 140 or a part thereof is a touch sensitive display or a touch screen. FIG. 1 also shows a target image object 150 that is being imaged by the camera unit 120. The target image object 150 is an object that is not static, for example a face of a person with at least the eyes moving or the hair being blown around by wind, or a rotating machine or the like. FIG. 1 also shows another image object or a group of objects 160 that forms a relatively static background for a still image or video.

The image objects in FIG. 1 will be used to describe different example embodiments which enable an easy creation of a cinemagraph. Cinemagraphs are basically still images with an element, or rather a part of the image, moving. Some of these example embodiments employ only circuitries within the camera unit 120 while some other embodiments use circuitries external to the camera unit 120. Before further explaining the operations, let us introduce some example structures with which at least some of the described example embodiments can be implemented.

Figure 2:
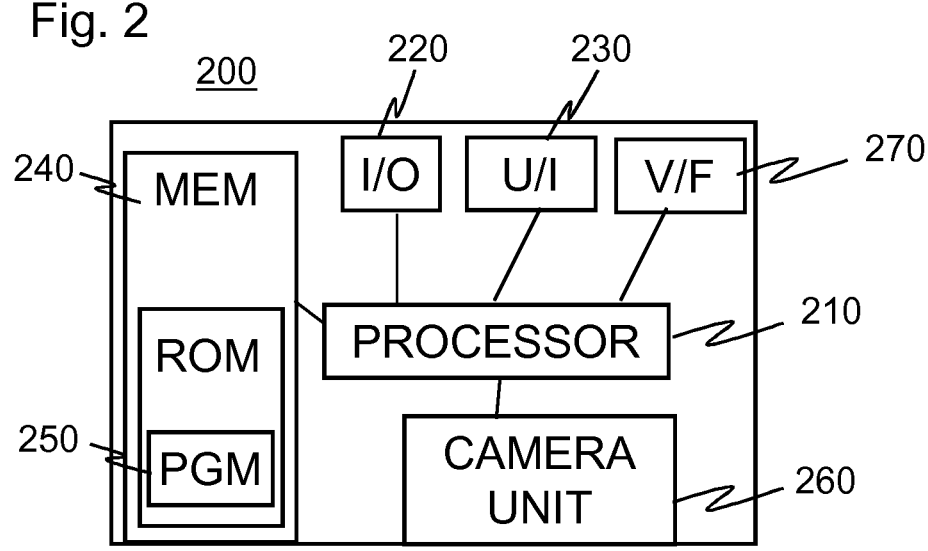
FIG. 2 shows a block diagram of an apparatus of an example embodiment of the invention.

FIG. 2 shows a block diagram of an apparatus 200 of an example embodiment of the invention. The apparatus 200 is suited for operating as the device 110. The apparatus 200 comprises a communication interface 220, a processor 210 coupled to the communication interface module 220, and a memory 240 coupled to the processor 210. The memory 240 comprises a work memory and a non-volatile memory such as a read-only memory, flash memory, optical or magnetic memory. In the memory 240, typically at least initially in the non-volatile memory, there is stored software 250 operable to be loaded into and executed by the processor 210. The software 250 may comprise one or more software modules and can be in the form of a computer program product that is software stored in a memory medium. The apparatus 200 further comprises a camera unit 260 and a viewfinder 270 each coupled to the processor.

It shall be understood that any coupling in this document refers to functional or operational coupling; there may be intervening components or circuitries in between coupled elements.

The communication interface module 220 is configured to provide local communications over one or more local links. The links may be wired and/or wireless links. The communication interface 220 may further or alternatively implement telecommunication links suited for establishing links with other users or for data transfer (e.g. using the Internet). Such telecommunication links may be links using any of: wireless local area network links, Bluetooth, ultra-wideband, cellular or satellite communication links. The communication interface 220 may be integrated into the apparatus 200 or into an adapter, card or the like that may be inserted into a suitable slot or port of the apparatus 200. While FIG. 2 shows one communication interface 220, the apparatus may comprise a plurality of communication interfaces 220.

The processor 210 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one processor 210, but the apparatus 200 may comprise a plurality of processors.

As mentioned in the foregoing, the memory 240 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. In some example embodiments, only volatile or non-volatile memory is present in the apparatus 200. Moreover, in some example embodiments, the apparatus comprises a plurality of memories. In some example embodiments, various elements are integrated. For instance, the memory 240 can be constructed as a part of the apparatus 200 or inserted into a slot, port, or the like. Further still, the memory 240 may serve the sole purpose of storing data, or it may be constructed as a part of an apparatus serving other purposes, such as processing data. Similar options are thinkable also for various other elements.

A skilled person appreciates that in addition to the elements shown in FIG. 2, the apparatus 200 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus when external power if external power supply is not available.

It is also useful to realize that the term apparatus is used in this document with varying scope. In some of the broader claims and examples, the apparatus may refer to only a subset of the features presented in FIG. 2 or even be implemented without any one of the features of FIG. 2. In one example embodiment term apparatus refers to the processor 210, with an input for the processor 210 configured to receive information from the camera unit and an output for the processor 210 configured to provide information to the camera unit for adjusting focus setting.

Figure 3:
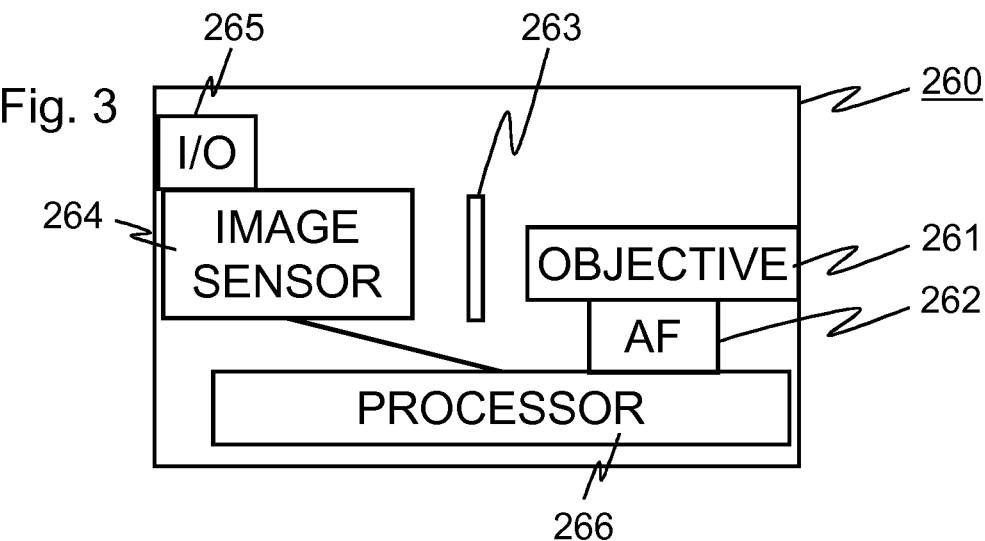
FIG. 3 shows a block diagram of a camera unit of an example embodiment of the invention.

FIG. 3 shows a block diagram of a camera unit 260 of an example embodiment of the invention. The camera unit 260 is capable of capturing video and still images and comprises an objective 261, an autofocus unit 262 configured to adjust focusing of the objective 261, an optional mechanical shutter 263, an image sensor 264 and an input and/or output 265. The camera unit 260 further comprises, in one example embodiment, further processor 266, hereinafter referred to as the camera processor, communicatively connected to the autofocus unit 262 and to the image sensor 264. When implemented, the camera processor 266 can participate in creating a cinemagraph within the camera unit 260. The camera processor can be any type of a processor e.g. such as the alternatives described with reference to FIG. 2. Furthermore, a skilled person appreciates that in addition to the elements shown in FIG. 3, the camera unit 260 may comprise other elements, such as a zoom unit, image stabilization unit and further circuitry.

Figure 4:
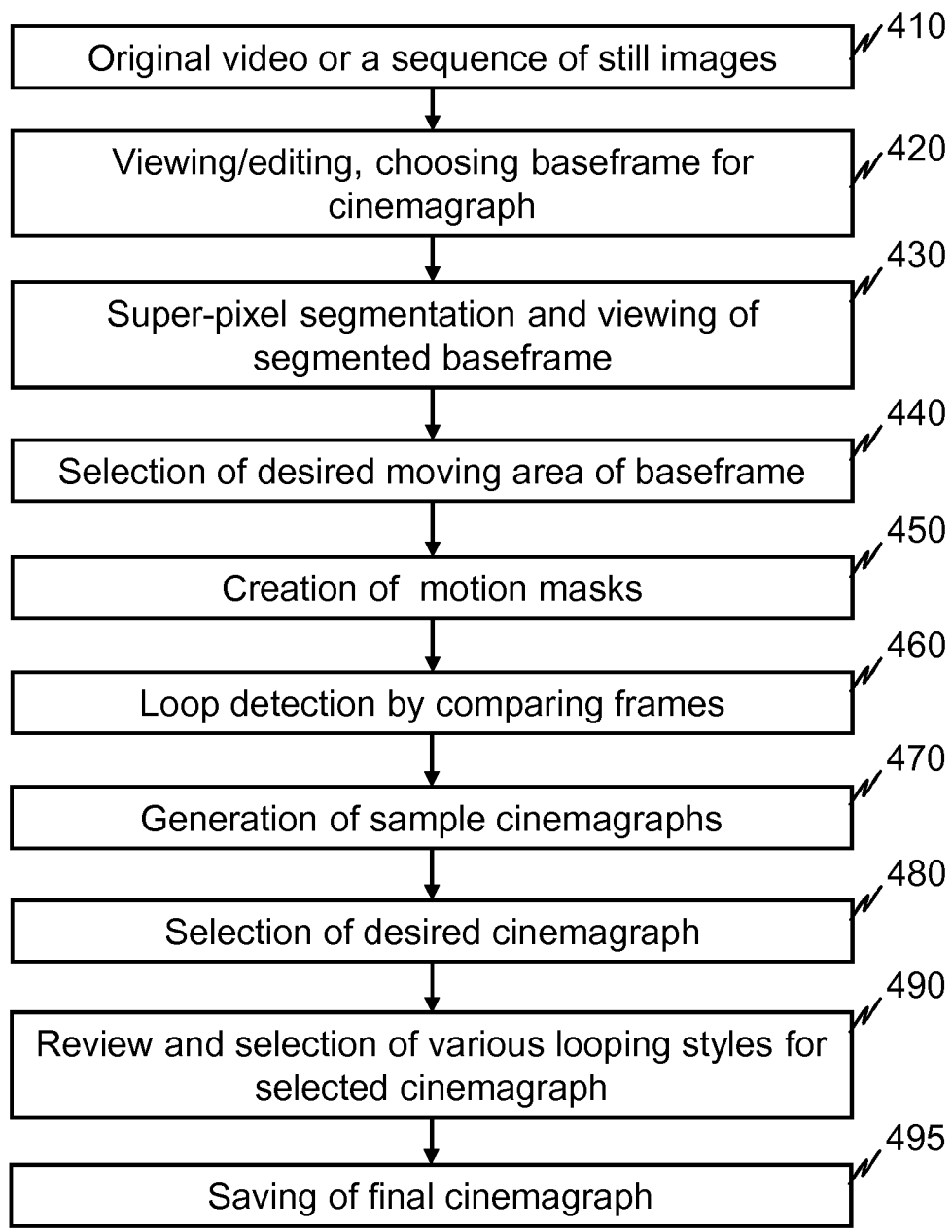
FIG. 4 shows a flow chart illustrating basic operations in a process according to an example embodiment.

FIG. 4 shows a flow chart illustrating basic operations in a process according to an example embodiment. A skilled person appreciates that in addition to the steps described hereinafter, any further image or video processing operations, such as color enhancing, cropping, filtering or the like, may be carried out at any stage of the process.

At step 410 the user uses the apparatus 200 to capture a video or a sequence of still images portraying the target image object 150 at least a part of which is moving and a relatively static background 160. The sequence of still images may be any group of two or more images, i.e. the images need not be temporally in a correct order. For example, a sequence of images can be captured in an office break room on several consecutive days portraying a coffee pot with varying surface levels. The images of this sequence could be arranged in an order not reflecting the actual temporal order the images were captured in but rather in an order according to the surface level. Alternatively, images can be received from more than one source e.g. from many different people who have taken images of a mountain top from same place but on different days. In this case, the images are not necessarily sequential in terms of any of capture time, image content or file name. Furthermore, alternatively, the images of the sequence are in temporal order. Furthermore, the skilled person appreciates that a video basically also is a group of still images. In a further example embodiment, the video or a sequence of still images is not captured using the apparatus 200, but otherwise retrieved, for example by downloading it with the communications interface 220 or by bringing it to the apparatus using an external storage medium.

At step 420 the video or the sequence of still images is opened for viewing and editing. The video is viewed for example on the display 140 of the apparatus 200. The user of the apparatus is presented with a user interface with which she can view the separate frames of the video or the still images of the sequence of still images, both of which alternatives are hereinafter referred to as frames. In an example embodiment, the user interface comprises a slider element implemented on a touch sensitive portion of the display 140. The user is able to shuffle through the frames by moving the slider with her finger or a separate pointing device such as a stylus.

Figure 5:
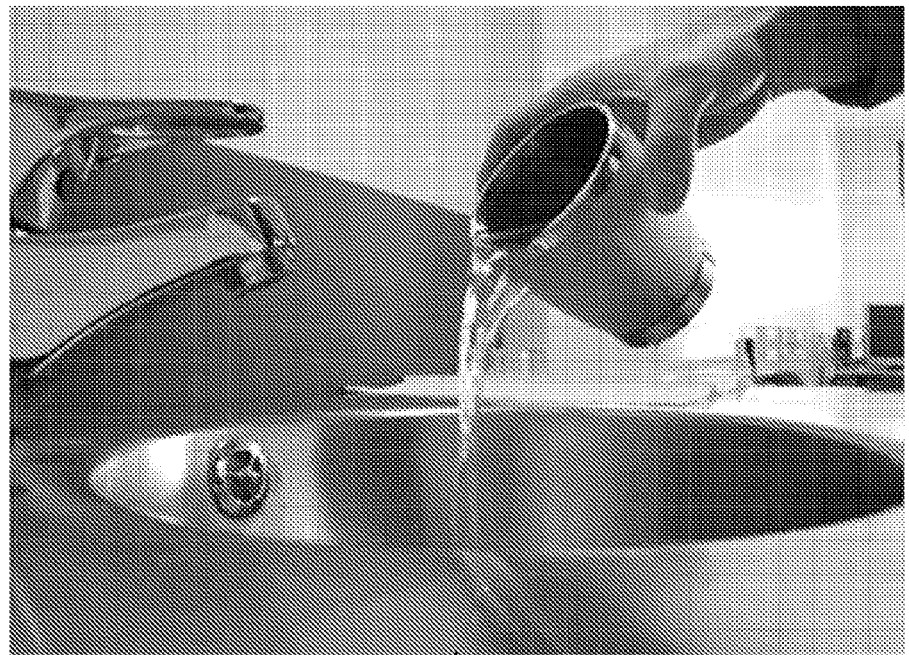
FIG. 5 shows an example image chosen as baseframe for a cinemagraph.

Furthermore, at step 420 the user chooses a frame from the video or from the sequence of still images as a baseframe image, hereinafter referred to as the baseframe, for the cinemagraph. The user indicates her choice through the user interface, for example by checking a check box displayed. In an example embodiment, the user chooses the frame most esthetically pleasing or the frame technically most suitable, e.g. with the best focus on the element that will move in the final cinemagraph. In a further example embodiment, the most suitable frames are automatically pre-selected and indicated to the user, for example by showing them first on the display independent of their position in the video or sequence of images, or by otherwise indicating their suitability on the display. An example baseframe 510 is shown in FIG. 5. In a further example embodiment, the baseframe is chosen from another video or sequence of still images or a single still image is chosen as the baseframe. The further still image, sequence of still images and/or video is captured with the apparatus 200 or brought to the apparatus in a conventional manner. In such a case, the chosen baseframe is in later processing steps considered for example the first, last or middle frame of the video or sequence of still images from which the cinemagraph is being created.

Figure 6:
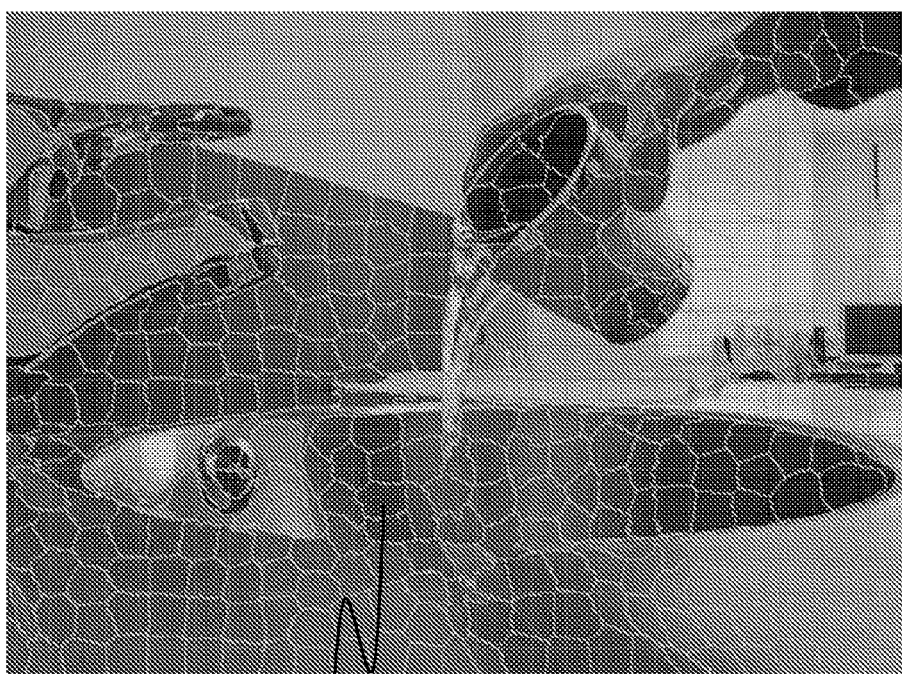
FIG. 6 shows the super-pixel segmentation of the example baseframe of FIG. 5.

At step 430 the baseframe chosen by the user is processed with an algorithm in order to segment it. In an example embodiment, the baseframe is segmented into super-pixels or voxels 610, i.e. clusters of pixels. The super-pixels or voxels 610 are formed based on image characteristics, for example boundaries in the image, component edges in the image, recognized objects in the image, hue or saturation values and/or the like. In an example embodiment a simple linear iterative clustering (SLIC) algorithm is used. In a further example embodiment, the segment structure is shown on the display on top of the baseframe and the baseframe is displayed in grayscale or otherwise colorized. An example baseframe with super-pixel 610 segmentation is shown in FIG. 6.

Figure 7:
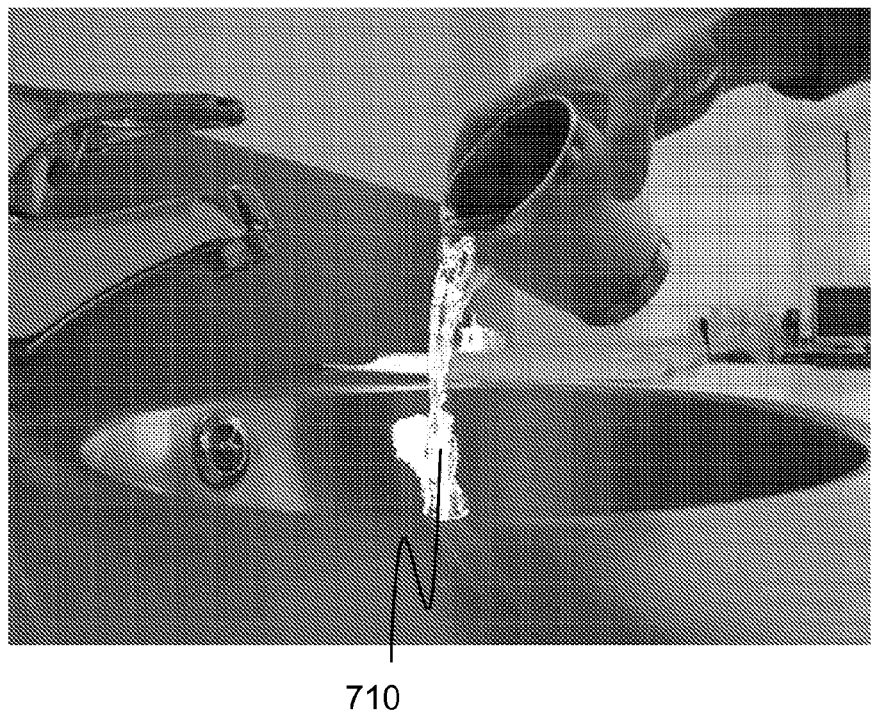
FIG. 7 shows the area selected or painted by the user from the example super-pixel segmented baseframe of FIG. 6.

At step 440 the user selects an area of the super-pixel segmented baseframe. The selected area is the area that contains the parts of the target object 150 that are desired to move in the final cinemagraph. For example in the example baseframe of FIGS. 5 and 6 the water flowing from the cup is desired to move in the final cinemagraph. The super-pixels enable an easier user-selection through user interface provided on for example touch sensitive portion of the display 140. The user selects the desired segments for example by touching them, i.e. by touching one or more pixels that are a part of the segment, with her finger or by making scribbles or sliding movements akin to finger-painting on the touch sensitive portion of the display 140. In result, the segment containing the touched pixels is selected. In an example embodiment, the segments in the neighborhood of the user scribbles are selected automatically. In a further example embodiment, the baseframe is shown in grayscale or otherwise colorized and the selected segments are then shown in original colors making the selection more user-friendly and intuitive. Alternatively, the baseframe is shown in original colors and the selected area is colorized. An example selection is shown in FIG. 7, wherein the area 710 roughly selected by the user is shown in white.

After the user has selected the desired area, albeit often roughly, a mask or several masks, hereinafter referred to as motion masks, are created from the selection at step 450. Generally, a mask is often a two-color image of the same dimensions as the original image or the region of interest in the image. When executing operations on the image the mask is used to restrict the results of the operation to the area in the mask having a certain color value, i.e. the selected or active or white area in the mask. In an example embodiment, the motion masks are greyscale images having a white selected mask area. A skilled person appreciates that alternatively different types of mask can be used in a manner conventional in image and video processing.

Figure 8:
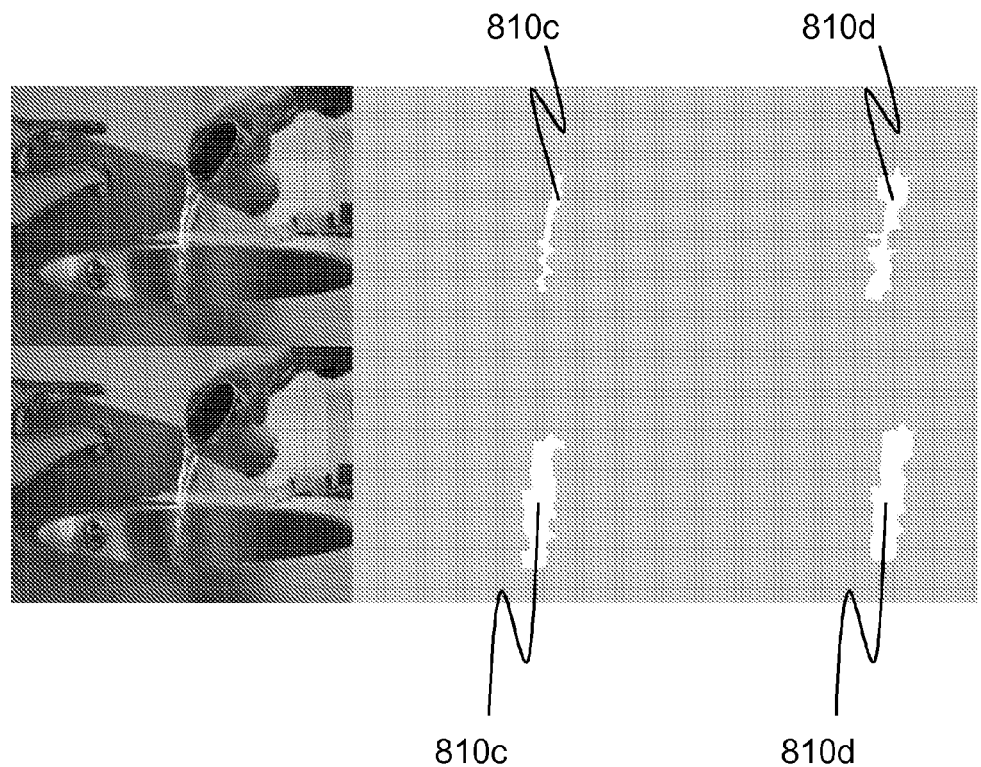
FIG. 8 shows an example of motion masks created based on the user selected area of FIG. 7.

The area, or rather the segments, selected by user are desired to contain the whole area that is supposed to move, but since user input is not necessarily accurate the selection often is not accurate. The area selected by the user often contains also holes. Accordingly, several motion masks are created in order to compensate a possible inaccurate user selection. The further motion masks are created for example by increasing the size of the user selection with an algorithm using the segments selected by the user as input. In an example embodiment, the further motion masks are created using a mask enlargement and gap filling algorithm to further select super-pixel segments near (e.g. adjacent) and/or in-between the user selected segments in addition to the user selected segments in order to enlarge the mask outside the user selection or fill holes or gaps in the user selection. In a further example embodiment, one of the motion masks is the original user selection and the other motion masks are created by selecting in addition to the user selection neighboring segments of each user-selected segment on all or some sides. In a further example embodiment, a motion mask is created by analyzing the movement in the video or sequence of still images. An example of several motion masks 810a to 810d created from the user selection is shown in FIG. 8.

At step 460, loop detection is carried out in order to find the most suitable seamless loop of movement for the cinemagraphs, i.e. to find the most similar frames with respect to the selected movement area and to minimize the number of frames used for the movement in the cinemagraph. The loop detection and sample cinemagraph generation described hereinafter is carried out for each motion mask previously created. The loop detection is carried out automatically by a loop-detection algorithm using the baseframe and the motion mask as input. In an example embodiment, the algorithm searches for a smallest rectangle area into which the selected area of the motion mask fits. By choosing the smallest possible rectangle area, the algorithm works faster, since the most similar frames are searched only using the rectangle area instead of the whole baseframe.

As the rectangle has been selected, the frames of the video or the sequence of still images are compared by calculating the absolute differences, for example using a sum of absolute differences (SAD) algorithm. The comparison is carried out for the frames on both sides of the baseframe in the original video or sequence of images. In an example embodiment, a comparison range is preselected by the user or automatically and the comparison is started from the frame situated at the distance corresponding to the comparison range before the baseframe and continued for all or some frames until the frame at a distance corresponding to the comparison range after the baseframe has been reached. In an example embodiment a comparison step size is preselected by the user or automatically and only frames at the distance of the comparison step size from each other are compared, for example every fifth frame. The comparison results in the selection of most similar frames, the number of which is preselected automatically or by the user. At step 470, a sample or first cinemagraph is created for each of the motion masks previously created. The sample cinemagraph generation described hereinafter is carried out for each motion mask previously created. Each motion mask has a corresponding starting and ending frame or image chosen as hereinbefore described. The baseframe is used as base image and starting from the first chosen frame, each frame is masked with the motion mask in such a way that the masked area, i.e. the area selected by user and improved as hereinbefore described, will be the only different part from the base image. Accordingly, every cinemagraph image will have the same static part, i.e. background 160 and only the masked region, i.e. the selected part of the target image object 150, will have motion. This creates the cinemagraph effect.

Often the apparatus used for capturing the video or the sequence of still images is not a static apparatus, i.e. the user has held the apparatus in her hand during capturing, causing hand shake and like effects to the video or sequence of still images. This might cause disturbance on the cinemagraph, the background 160 of which needs to be almost static. Accordingly, in an example embodiment aligning and/or warping of the chosen frames is carried out.

In an example embodiment, if the undesired motion is relatively small and only two-dimensional, a block motion search and alignment of the frames based thereon is carried out. In an example embodiment, an area around the previously selected rectangle is used for the block motion search. The use of an area around the rectangle avoids or reduces the interference of the motion on the selected area with desired movement. In a further example embodiment, as the camera motion can be in three rotational and three translational directions, a perspective transform matrix, for example a homography matrix, is used. An example embodiment comprises using a feature detection algorithm or algorithms to obtain key points from at least two frames and these key points are then matched with each other. The perspective transform matrix is estimated based on the matched key points subset and suitable algorithm or algorithms, for example a least-square algorithm, a random sample consensus (RANSAC) algorithm and/or a least median of squares (LMeDs) algorithm. After this, each previously chosen frame is warped using a perspective transform matrix in order to remove the interference from undesired motion in the video or sequence of still images.

At step 480, each sample or first cinemagraph is made available for review for the user, and the user selects the most pleasing one, for example the cinemagraph in which the motion mask was best selected. In an example embodiment, the sample cinemagraphs are displayed on the display 140 and a user interface is provided for reviewing the cinemagraphs and choosing the desired first cinemagraph.

At step 490, alternative looping variations are provided for the previously chosen first cinemagraph. In an example embodiment, at least one second cinemagraph is created by choosing the closest matching frames as start and end points in order to provide a smooth transition at the end of each loop. Since the movement in the video or sequence of still images is not necessarily smooth, which deteriorates the quality of the cinemagraph, further alternatives are provided. In a further example embodiment, at least one second cinemagraph is created by adding the frames of the first cinemagraph in a backwards order to the end of the first cinemagraph for smoother motion. In a further example embodiment, at least one second cinemagraph is created by creating additional frames by interpolation between the existing frames of the first cinemagraph or between the last and first frame of the first cinemagraph. In an example embodiment, the first cinemagraph and the at least on second cinemagraph, i.e. each looping variation, are made available for review for the user, and the user selects the most pleasing one, for example the cinemagraph in which the transition at the end of the loop is the smoothest. In an example embodiment, the cinemagraphs with different looping variations are displayed on the display 140 and the user is allowed, using a user interface, to review the variations and choose the desired one.

At step 495, the final cinemagraph is saved as a file, for example as a graphic interchange format file (GIF) or a moving pictures expert group 4 (MPEG4) file.

Without in any way limiting the scope, interpretation, or application of the claims appearing below, a technical effect of one or more of the example embodiments disclosed herein is the provision of an easy and fast cinemagraph creation. Another technical effect of one or more of the example embodiments disclosed herein is the enhancement of the user-experience by an interactive and game-like interface. Another technical effect of one or more of the example embodiments disclosed herein is that cinemagraphs of increased quality may be provided by using the super-pixel segmentation for providing improved masking. Another technical effect of one or more of the example embodiments disclosed herein is that cinemagraphs of increased quality may be provided thanks to robustness to interaction errors, and/or thanks to selective user input. Yet another technical effect of one or more of the example embodiments disclosed herein is that a cinemagraph may be semi-automatically created from any video featuring a moving object.

Embodiments of the present invention may be implemented in software, hardware, application logic or a combination of software, hardware and application logic. The software, application logic and/or hardware may reside on the camera unit, a host device that uses the camera unit or even on a plug-in module. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, with two examples of a suited apparatus being described and depicted in FIGS. 2 and 3. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. If desired, user input may be received or given at any time or concurrently with other functions. Furthermore, if desired, one or more of the previously described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   a user interface;

a memory configured to store a sequence of images; and
a processor configured to cause:
> receiving user input from a user through the user interface;
> selecting based on the user input from the sequence of images an image as a baseframe image;
> segmenting the baseframe image;
> selecting based on the user input at least one segment of the baseframe image; creating a mask based on the at least one selected segment;
> selecting from the sequence of images at least one image most similar to the baseframe image using the mask;
> aligning the selected images with the baseframe image; and
> creating a first cinemagraph from the selected images and the baseframe image using the mask.

2. The apparatus according to claim 1 further comprising a camera unit, wherein the processor is further configured to cause capturing the sequence of images with the camera unit.

3. The apparatus according to claim 1, wherein the processor is further configured to cause creating at least one second cinemagraph by changing the order of the images and the baseframe image in the first cinemagraph.

4. The apparatus according to claim 1, wherein the processor is further configured to cause creating at least one second cinemagraph by adding duplicate images to the first cinemagraph.

5. The apparatus according to claim 1, wherein the processor is further configured to cause creating at least one second cinemagraph by adding images interpolated from the existing images and the baseframe image of the first cinemagraph to the first cinemagraph.

6. The apparatus according to claim 3, wherein the apparatus further comprises a display; and the processor is further configured to cause presenting the first and the at least one second cinemagraph to the user on the display; and to cause selecting a cinemagraph from the first and at least one second cinemagraph based on the user input.

7. The apparatus according to any claim 1, wherein the baseframe image is segmented into super-pixels.

8. The apparatus according to claim 7, wherein the super-pixels are formed based on image characteristics.

9. The apparatus according to claim 1, wherein at least two masks are created based on the user input.

10. The apparatus according to claim 9, wherein at least one of the masks is created using a mask enlargement algorithm to enlarge the mask by further selecting one or more adjacent super-pixels in addition to the selected super-pixels.

11. The apparatus according to claim 9, wherein at least one of the masks is created using a gap filling algorithm to enlarge the mask by further selecting one or more super-pixels in-between the selected super-pixels in addition to the selected super-pixels.

12. The apparatus according to claim 9, wherein the processor is further configured to cause repeating the selecting from the sequence of images at least one image most similar to the baseframe image so that for each mask at least the one image is selected.

13. The apparatus according to claim 9, wherein the processor is further configured to cause repeating the aligning the selected images with the baseframe image so that the images selected using each mask are aligned.

14. The apparatus according to claim 1, wherein the processor is further configured to cause aligning of the images using an alignment algorithm.

15. The apparatus according to claim 9, wherein the processor is further configured to cause repeating the forming a first cinemagraph from the selected images and the baseframe image so that for each mask a first cinemagraph is created.

16. The apparatus according to claim 15, wherein the processor is further configured to cause presenting the at least two first cinemagraphs to the user on the display; and to cause selecting a single first cinemagraph from the at least two first cinemagraphs based on the user input.

17. The apparatus according to claim 1, wherein the mask comprises a masked area; and wherein the processor is further configured to cause the selecting from the sequence group of images at least one image most similar to the baseframe image using a mask by determining the smallest rectangle in which the masked area fits and comparing the area of said rectangle in at least some of the images of the sequence of images.

18. The apparatus according to claim 17, wherein the processor is further configured to cause comparing the area of said rectangle in at least some of the images of the sequence of images using an algorithm.

19. The apparatus according to claim 1, wherein the display is a touch sensitive display; and the processor is configured to receive the user input from the touch sensitive display.

20. The apparatus according to claim 1, wherein the user interface is configured to receive the user input in at least two different entries from the user.

21. The apparatus according to claim 1, wherein the processor is further configured to cause storing the cinemagraph into a file.

22. A method comprising:
> receiving user input from a user through a user interface;
> selecting based on user input an image from a sequence of images as a baseframe image;
> segmenting the baseframe image;
> selecting based on the user input at least one segment of the baseframe image;
> creating a mask based on the at least one selected segment;
> selecting from the sequence of images at least one image most similar to the baseframe image using the mask;
> aligning the selected images with the baseframe image; and
> creating a first cinemagraph from the selected images and the baseframe image using the mask.

23. The method according to claim 22 further comprising capturing the sequence of images with a camera unit.

24. The method according to claim 22 or 23 further comprising storing a sequence of images into a memory.

25. The method according to claim 22 further comprising creating at least one second cinemagraph by changing the order of the images and the baseframe image in the first cinemagraph.

26. The method according to claim 22 further comprising creating at least one second cinemagraph by adding duplicate images to the first cinemagraph.

27. The method according to claim 22 further comprising creating at least one second cinemagraph by adding images interpolated from the existing images and the baseframe image of the first cinemagraph to the first cinemagraph.

28. The method according to claim 25, further comprising presenting the first and at least one second cinemagraph to the user; and selecting a cinemagraph from the first and at least one second cinemagraph based on the user input.

29. The method according to claim 22, wherein the baseframe image is segmented into super-pixels.

30. The method according to claim 29, wherein the super-pixels are formed based on image characteristics.

31. The method according to claim 22, wherein at least two masks are created based on the user input.

32. The method according to claim 31, wherein at least one of the masks is created using a mask enlargement algorithm to enlarge the mask by further selecting one or more adjacent super-pixels in addition to the selected super-pixels.

33. The method according to claim 31, wherein at least one of the masks is created using a gap filling algorithm to enlarge the mask by further selecting one or more super-pixels in-between the selected super-pixels in addition to the selected super-pixels.

34. The method according to claim 31 further comprising repeating the selecting from the sequence of images at least one image most similar to the baseframe image so that for each mask at least the one image is selected.

35. The method according to claim 31 further comprising repeating the aligning the selected images with the baseframe image so that the images selected using each mask are aligned.

36. The method according to claim 22, wherein the aligning of the images comprises using an aligning algorithm.

37. The method according to claim 31, further comprising repeating the forming a first cinemagraph from the selected images and the baseframe image so that for each mask a first cinemagraph is created.

38. The method according to claim 37 further comprising presenting the at least two first cinemagraphs to the user; and selecting a single first cinemagraph from the at least two first cinemagraphs based on the user input.

39. The method according to claim 22, wherein the mask comprises a masked area; and wherein the selecting from the sequence of images at least one image most similar to the baseframe image using a mask comprises determining the smallest rectangle in which the masked area fits and comparing the area of said rectangle in at least some of the images of the sequence of images.

40. The method according to claim 39, wherein comparing the area of said rectangle in at least some of the images of the sequence of images comprises using an algorithm.

41. The method according to claim 22, wherein the user input is received through a touch sensitive display.

42. The method according to claim 22 further comprising storing the cinemagraph into a file.

43. A non-transitory program storage device comprising computer code for causing performance of the method of claim 22, when executed by an apparatus.

* * * * *